US010398165B2

(12) United States Patent
Van Gerwen

(10) Patent No.: US 10,398,165 B2
(45) Date of Patent: *Sep. 3, 2019

(54) APPARATUS AND PROCESS FOR THE PRODUCTION WITH AN INTERLEAVER

(71) Applicant: GEA FOOD SOLUTIONS BAKEL B.V., Bakel (NL)

(72) Inventor: Hendrikus Petrus Gerardus Van Gerwen, Someren (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 53 days.

This patent is subject to a terminal disclaimer.

(21) Appl. No.: 15/212,427

(22) Filed: Jul. 18, 2016

(65) Prior Publication Data

US 2016/0324208 A1    Nov. 10, 2016

Related U.S. Application Data

(63) Continuation of application No. 13/988,360, filed as application No. PCT/EP2011/005894 on Nov. 23, 2011, now Pat. No. 9,439,443.

(30) Foreign Application Priority Data

Nov. 23, 2010    (EP) .................................... 10014873

(51) Int. Cl.
*A22C 7/00*    (2006.01)
*A23P 30/10*    (2016.01)
(Continued)

(52) U.S. Cl.
CPC ............ *A23P 30/10* (2016.08); *A22C 7/0069* (2013.01); *A22C 7/0076* (2013.01); *B65B 25/08* (2013.01);
(Continued)

(58) Field of Classification Search
CPC ... A22C 7/0069; A22C 7/0076; A22C 7/0084; A22C 7/0007; A22C 7/003; A22C 7/0038; A23P 30/20; B65B 25/08; B65B 25/065
(Continued)

(56) References Cited

U.S. PATENT DOCUMENTS 3,137,029 A    6/1964    De Zolt
3,952,478 A    4/1976    Richards
(Continued)

FOREIGN PATENT DOCUMENTS

CN    2428989 Y    5/2001
CN    101444323 A    6/2009
(Continued)

OTHER PUBLICATIONS

Examination report for European Application No. 10014873.3, dated Sep. 15, 2016.
(Continued)

*Primary Examiner* — Seyed Masoud Malekzadeh
(74) *Attorney, Agent, or Firm* — The Dobrusin Law Firm, P.C.

(57) ABSTRACT

An apparatus for formation of products comprising an edible material and an interleaver, the apparatus including a drum with mold cavities, each with a bottom and a sidewall, in which the edible material is formed. The apparatus including an interleaver storage having one or more interleavers, and a transportation means configured to transport the one or more interleavers from the interleaver storage to a circumference of the drum where the edible material is placed on the interleaver. The bottom and/or the sidewall is made from a porous material and pressurized gas is forced through the porous material to eject the edible material from the mold
(Continued)

cavities. After ejection, the products are stacked such that one interleaver is between two edible materials.

17 Claims, 13 Drawing Sheets

(51) Int. Cl.
 *B65B 25/08* (2006.01)
 *B65B 25/06* (2006.01)

(52) U.S. Cl.
 CPC ............ *A22C 7/003* (2013.01); *A22C 7/0007* (2013.01); *A22C 7/0038* (2013.01); *A22C 7/0084* (2013.01); *B65B 25/065* (2013.01)

(58) Field of Classification Search
 USPC ......... 425/89, 134, 241, 374, 357, 362, 437, 425/438
 See application file for complete search history.

(56) References Cited

U.S. PATENT DOCUMENTS

| | | | |
|---|---|---|---|
| 3,991,168 A * | 11/1976 | Richards | A23B 4/064 426/119 |
| 4,054,967 A | 10/1977 | Sandberg et al. | |
| 4,212,609 A | 7/1980 | Fay | |
| 4,578,027 A | 3/1986 | Koppa et al. | |
| 5,971,842 A | 10/1999 | Simpson et al. | |
| 6,811,802 B2 | 11/2004 | Van Esbroeck et al. | |
| 7,284,973 B2 | 10/2007 | Van Esbroeck et al. | |
| 7,597,549 B2 | 10/2009 | Van Esbroeck et al. | |
| 7,655,173 B2 | 2/2010 | Azzar et al. | |
| 7,819,650 B2 | 10/2010 | Meskendahl et al. | |
| 7,824,172 B2 | 11/2010 | Azzar et al. | |
| 7,824,599 B2 | 11/2010 | Azzar et al. | |
| 9,402,413 B2 | 8/2016 | Van Esbroeck et al. | |
| 9,414,605 B2 | 8/2016 | Le Paih et al. | |
| 9,439,443 B2 | 9/2016 | Van Gerwen | |
| 2002/0012731 A1 | 1/2002 | van Esbroeck et al. | |
| 2005/0003062 A1 | 1/2005 | Van Esbroeck et al. | |
| 2005/0013895 A1 | 1/2005 | Azzar | |
| 2005/0220932 A1 * | 10/2005 | van der Eerden | A22C 7/0069 426/1 |
| 2006/0013916 A1 | 1/2006 | Azzar | |
| 2007/0224305 A1 | 9/2007 | Meskendahl et al. | |
| 2009/0087530 A1 * | 4/2009 | Miller | A22C 7/0076 426/420 |
| 2009/0134544 A1 | 5/2009 | Van Der Eerden et al. | |
| 2011/0151082 A1 | 6/2011 | Van Gerwen et al. | |
| 2013/0224357 A1 | 8/2013 | Van Gerwen | |

FOREIGN PATENT DOCUMENTS

| | | |
|---|---|---|
| EP | 1744635 A2 | 1/2007 |
| EP | 2064951 A | 6/2009 |
| EP | 2064956 A1 | 6/2009 |
| EP | 2454943 A1 | 5/2012 |
| EP | 2618674 A1 | 7/2013 |
| FR | 2964833 A1 | 3/2012 |
| GB | 965468 A | 7/1964 |
| GB | 2192866 A | 1/1988 |
| GB | 2259043 A | 3/1993 |
| JP | S5198875 A | 8/1976 |
| JP | S51-098875 | 10/1976 |
| JP | 55-039988 | 3/1980 |
| JP | 56-035026 | 4/1981 |
| JP | S63-173569 | 7/1987 |
| JP | S63173569 A | 7/1988 |
| JP | 2000/511784 A | 9/2000 |
| JP | 2002/153203 A | 5/2002 |
| JP | 2007-536927 | 12/2007 |
| WO | 9852420 A1 | 11/1998 |
| WO | 0030458 A1 | 6/2000 |
| WO | 2005107481 A2 | 11/2005 |
| WO | 2012038381 A1 | 3/2012 |

OTHER PUBLICATIONS

International Preliminary Report on Patentability, PCT/EP2011/005894, dated Mar. 19, 2013.
International Search Report and Wrtten Opinion, PCT/EP2011/005984, dated Mar. 21, 2012.
European Search Report, Application No. 10014873.3-1260, dated Jun. 1, 2011.
Potentially related application, published as US2011/0151082, published Jun. 23, 2011 (Van Gerwen et al.).
Potentially related application, published as US2013/0224357, published Aug. 29, 2013 (Van Gerwen).
Chinese Office Action with Translation, Application No. 2011/80055323.5, dated Aug. 18, 2014.
Japanese Office Action for Application No. 2013-539173 dated Sep. 15, 2015.
English Abstract for Japanese Publication, Okamoto JP63-173569, Published on Jul. 18, 1988.
Japanese Office Action for Japanese Patent Application No. 2013539173, dated May 27, 2016.
Chinese 5th Office Action for Chinese Application No. 201180055323.5; dated Aug. 9, 2016.
Chinese Supplemental Search for Chinese Application No. 201180055323.5; dated Aug. 1, 2016.
Third Party Observation for European Application No. 20100014873 filed on Aug. 16, 2017.

* cited by examiner

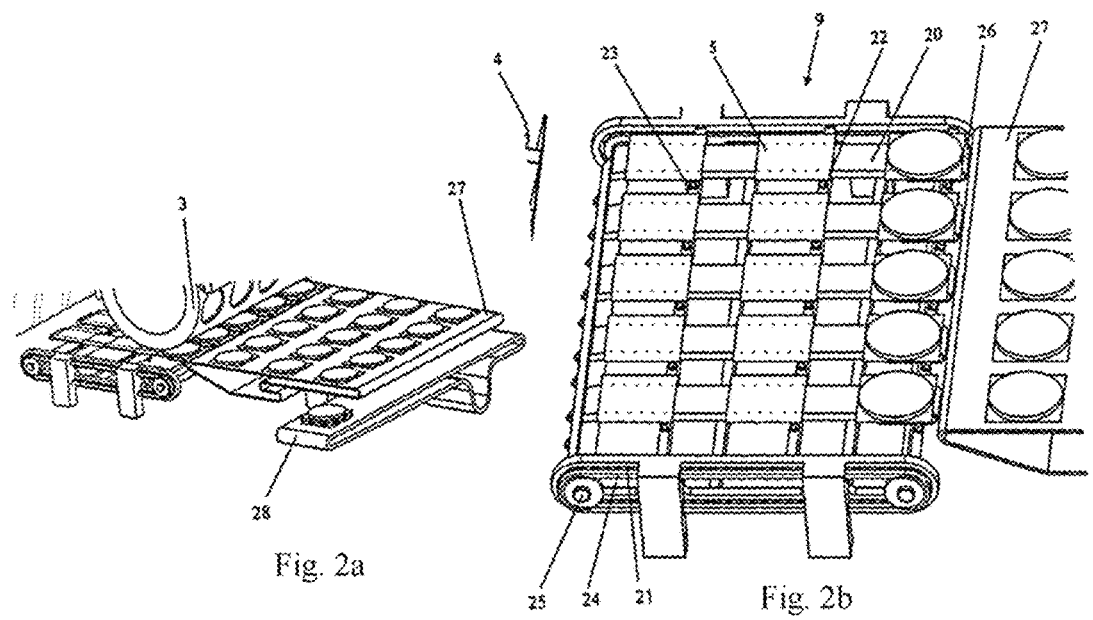

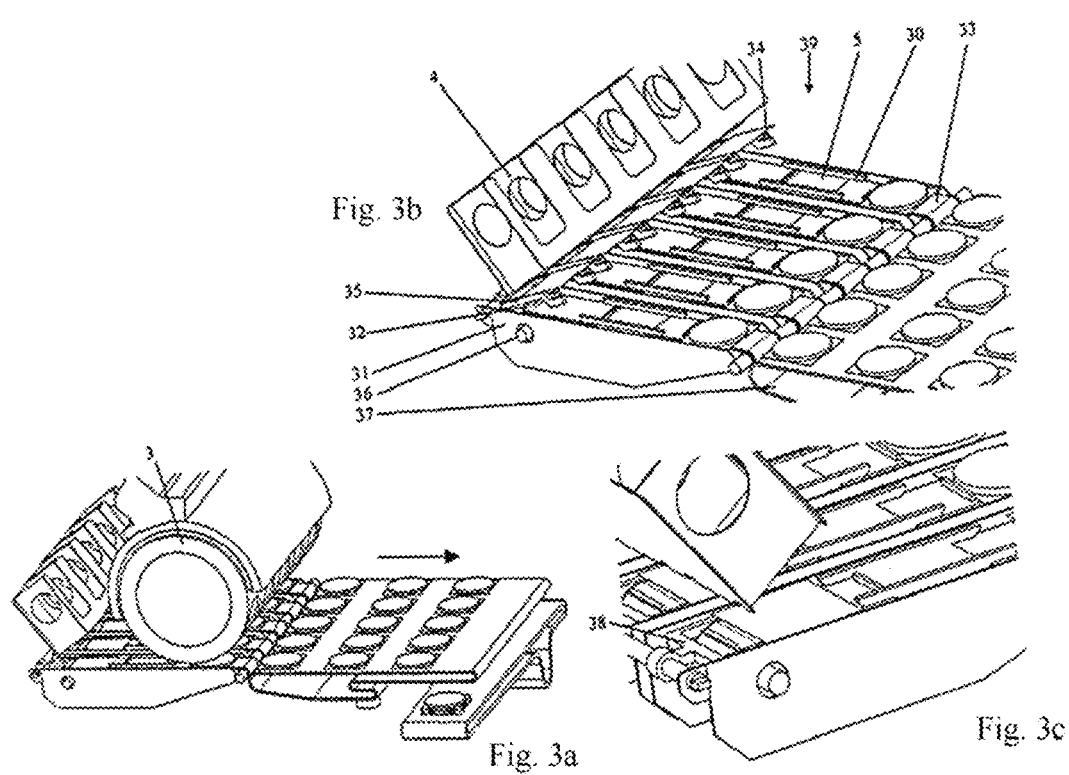

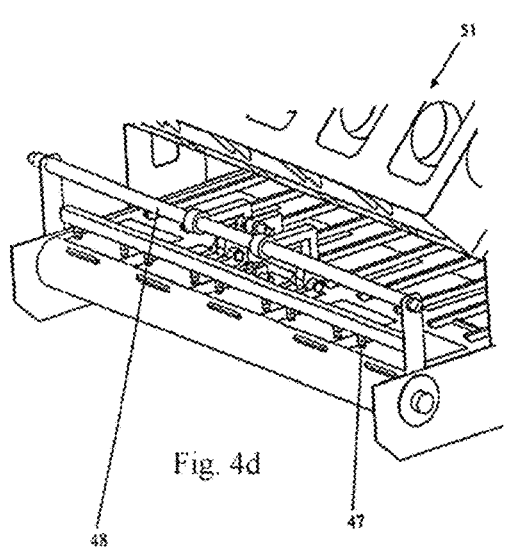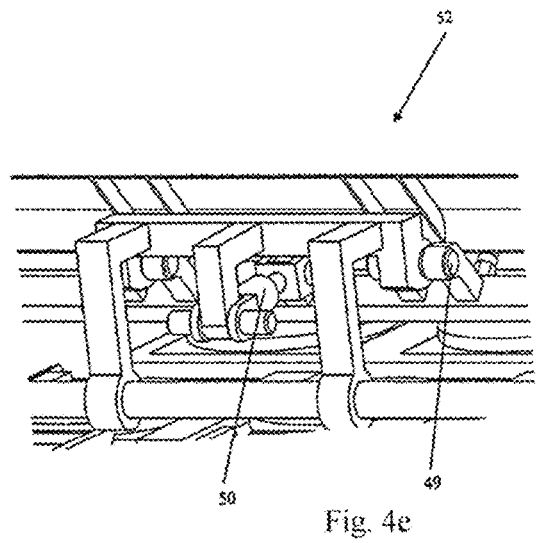
Fig. 4d
Fig. 4e

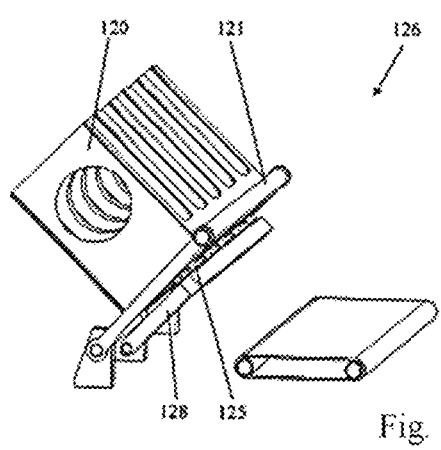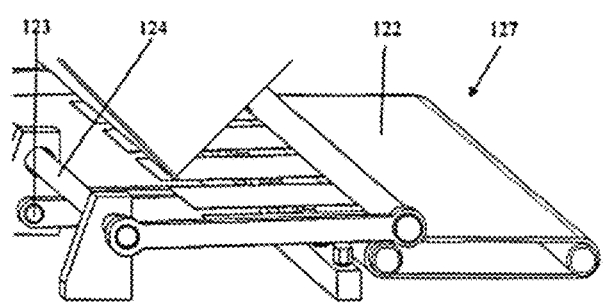
Fig. 10a
Fig. 10b
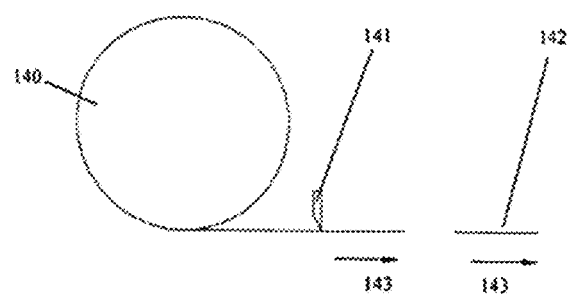
Fig. 11

APPARATUS AND PROCESS FOR THE PRODUCTION WITH AN INTERLEAVER

FIELD

The present invention relates to an apparatus for the formation of products comprising an edible material, preferably meat, and an interleaver.

BACKGROUND

Edible products for example patties, which are made from food products such as dough, vegetable material and/or meat material, in many cases, comprise an interleaver in order to make stacked products separateable.

It was therefore the objective of the present invention to provide an apparatus to produce products with an interleaver.

SUMMARY

This problem is attained by an apparatus for the formation of products comprising an edible material, preferably meat, and an interleaver, whereas the apparatus comprises a drum with mould cavities in which the edible material is formed, an interleaver storage and means to transport the interleaver from the storage to the circumference of the drum where the product is placed on the interleaver or vice versa.

The present invention relates to the formation of products comprising an edible material. This edible material is preferably a meat material such as minced meat. The meat can be meat from any type of animal or a mixture of different type of meats. The meat must have formable consistency. To the surface of each product an interleaver is attached, which is preferably a paper-like material, which can be coated with a substance to make the interleaver more water and/or grease resistant and/or to reduce the adhesive-force between the material and the interleaver. The interleaver can have the same size and shape as the edible material. However, it is also preferred, that the interleaver has a different size and/or shape than the edible material.

According to the present invention, the apparatus comprises a drum with mold cavities at its outer circumference. This drum rotates continuously and/or intermittently. The cavities comprise a bottom and a circumference. Preferably the bottom and/or the sidewall are made from a porous material. Due to this porous material, each cavity can be vented during its filling, vacuum can be applied to adhere the material and/or the interleaver to the cavity and/or pressurized gas can be forced through the porous material to eject the edible product and/or to clean the cavity. Into these cavities, which are open on one side, the edible material is pressed, in order to shape the material as desired for example into a flat circular shape, as it is used for hamburgers. However, the product can also be shaped in any other two dimensional or three-dimensional form. During the filling of the cavities, the drum can stand still or rotate. After the cavity has been filled, the filled cavities are rotated into a discharge position, in which the edible material is removed from the cavities and loaded on transport means to remove them from the inventive apparatus. The discharge of the edible material can be utilized or supported by pressurized air. The drum preferably comprises a multitude of cavities at its circumference at different angles. More preferably, the drum comprises a multitude of rows of cavities at different angles, whereas a row comprises at least two cavities, which are adjacent to each other parallel to the axis of rotation of the drum. In one embodiment according to the present invention, the one interleaver is placed into each cavity, before the cavity is filled with the edible material. The product, i.e. formed edible material plus interleaver are then discharged from the cavity. Preferably, the speed of rotation of the drum is controlled, for example by a PLC.

Furthermore, the apparatus comprises an interleaver storage, preferably with a multitude of compartments, more preferably one compartment per cavity in one row. This storage can be a stack of pre-cut interleaver sheets. However, this interleaver storage can also be a roll of interleaver material, from which individual interleavers are cut. In case the interleavers are stacked, the inventive apparatus preferably comprises means to individualize the interleavers, respectively.

Furthermore, the inventive machine comprises means to transport the individualized interleaver from the storage to the circumference of the drum. Here, the product is placed on the interleaver or the interleaver is placed on the product. During the placement of the product on the interleaver or vice versa, the drum can be stationary or can continue its rotating motion. In case that the drum is stationary, the interleaver is also stationary. In case that the drum rotates, the interleaver has to move as well, preferably at the same speed as the drum. The speed of the transportation means is preferably controlled, particularly by a PLC, for example in order to place the interleavers in the exact location, where the formed material is discharged from the drum and/or to adjust the speed of motion of the interleaver, especially during the discharge of the edible product to the interleaver. The transportation means may comprise attachment means, for example vacuum means, in order to attach the interleaver to the transportation means. The transportation means preferably has approximately the same width as the axial length of the drum. Preferably, the transportation means are height adjustable to optimize the discharge-distance, particularly the falling distance, between the drum and the transportation means.

In another preferred embodiment the apparatus comprises separation means to separate each interleaver from the storage. In a preferred embodiment this separation means also comprise attachment means, preferably vacuum means, to attach the interleaver to the separation means and thus withdraw the interleaver from the storage. The separation means separate each interleaver from the storage and places it on the transportation means and/or into the cavity of the drum. The separation means and transportation means can be one unit, which utilizes both functions. Preferably, one separation means per cavity of one row is provided.

Preferably, the interleaver storage and/or the separation means are reciprocatable between two positions. In case of the interleaver storage, it is, for example, moved between a home position, in which no interleavers are removed, and a separation position, in which the interleavers are handed over to the transportation means, the separation means or are directly placed into the cavities of the drum. The separation means can be reciprocated between a position in which they remove an interleaver from the storage and a position in which they hand the individual interleaver over to transportation means. Preferably, the interleaver storage and/or the separation means are rotated back and forth, more preferably driven by a gear, for example a cam. Preferably the motion of the interleaver storage and/or the separation means is controlled.

Preferably, a multitude of interleavers are separated from the storage and/or handed over to transportation means or to the drum, simultaneously. Preferably, a multitude of interleavers transported simultaneously to the drum.

In a preferred embodiment, the apparatus comprises a sensor, which detects the presence of interleaver preferably upstream of the drum in order to assure that each product is placed on an interleaver. Preferably, such a sensor is present for each cavity in one roll. In case, the sensor does not detect one interleaver for each cavity in one row, the production process is preferably interrupted.

In a preferred embodiment of the present invention the apparatus comprises transportation means downstream of the drum to transport the interleaver and the product away. This transportation means is preferably adjustable in its height relative to the discharge position of the drum in order to optimized the discharge-distance, e.g. the falling-height, of the edible material onto the belt. Preferably, the speed of the transportation means is also adjustable. This transportation means can be combined with the means that transport the blank interleaver to the discharge position of the drum. Preferably, the transportation means is also adjustable in its length. The transportation means is therefore preferably a shuttle belt which has one end that is reciprocable between a multitude of positions.

Another subject matter of the present invention is a process for the formation of products comprising an edible material, preferably meat and an interleaver, whereas in a drum with mould cavities the edible material is formed, an interleaver is removed from an interleaver storage and transported to the circumference of the drum where the product is placed on the interleaver or vice versa.

The disclosure regarding the inventive apparatus also applies to the inventive process and vice versa.

Preferably, the interleaver is held with vacuum during transportation.

Preferably, the interleaver is removed from the storage by means of vacuum.

The inventions are now explained in further detail according to FIGS. 1a-12b. These explanations do not limit the scope of protection. The disclosure made in one example also applies to the other examples.

BRIEF DESCRIPTION OF THE DRAWINGS

FIG. 2a and FIG. 2b show a second embodiment of the inventive apparatus.

FIG. 3a-FIG. 3c show yet another embodiment of the inventive apparatus.

FIGS. 4a-4e show a fourth embodiment of the inventive apparatus.

FIG. 10a and FIG. 10b show shows an embodiment of the present invention with a rotatable interleaver carriage.

FIG. 11 shows an embodiment with a roll of interleaver.

DETAILED DESCRIPTION

Figure 1A:
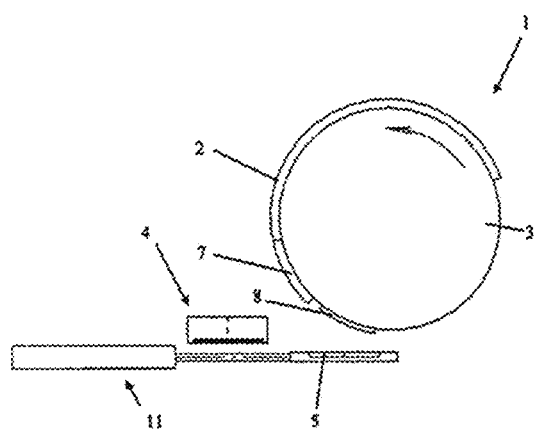
FIG. 1a and FIG. 1b show a first embodiment of the inventive apparatus.
Figure 1B:
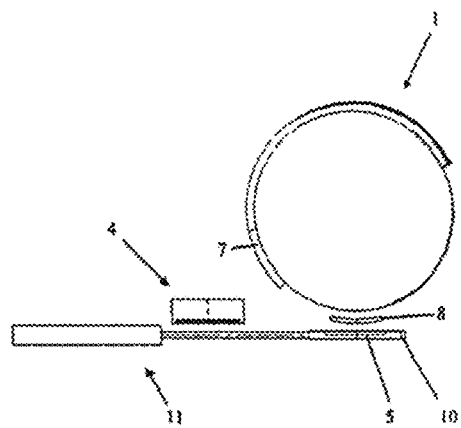

FIG. 1a and FIG. 1b show a first embodiment of the inventive food product forming apparatus 1. This apparatus comprises a rotating drum, which rotates in the present case counter clockwise as depicted by the arrow. Around its circumference, the drum comprises a multitude of cavities which are filled with the edible material, particularly meat, minced meat, in order to form the product into their desired shape. The apparatus 1 further comprises a housing 2, which is only shown schematically. This housing comprises an inlet and an outlet for the edible material. During its rotation, the individual cavity passes the outlet of the housing and is consequently filled with the edible material. Downstream of the outlet, preferably in the six-o'clock-position, the product is discharged from the drum and then the cavity can be cleaned and are subsequently filled again with edible material. Preferably, the drum comprises along its axial dimension a multitude of parallel cavities in one row in order to facilitate the simultaneous filling of a multitude of cavities and the simultaneous discharge of a multitude of formed product. In the present case, the housing is, downstream of the housing, extended by a guidance in order to avoid that the formed product 8 separates too soon from the drum 3. The inventive apparatus further comprises an interleaver carriage, which transports the individual interleaver sheet from a storage 4 to the discharge position, which may be located underneath of the drum (in the present case 6 o'clock) where the product is discharged on the interleaver 5 and then transported away by transport means (not depicted). The motion of the interleaver carriage 10 is facilitated by a drive 11, here a linear drive, which can be pneumatic drive. However, a motor controlled drive for example a servo-driven motor in combination with for example a toothed belt or a chain is preferred. In this preferred embodiment, it is possible to control the speed and/or position of the carriage 10 such that it has the same speed as the rotation of the drum and/or is at the exact position where the edible material is discharged. Thus, the drum need not be significantly or not at all decelerated during the handover of the product 8 to the interleaver.

The interleaver can have the same or a larger size than the formed edible material. Below are several embodiments where the paper may be even smaller as the dimension of the formed product.

FIG. 2a and FIG. 2b show another embodiment of the inventive apparatus. In FIG. 2a, it can be seen that the drum can comprise a number of cavities (here five) in one row parallel to the axis of rotation of the drum. The drum comprises a multitude of rows at different angles around the circumference of the drum. The transportation means, according to the present embodiment, comprises vacuum means 22, here vacuum cups, which will each carry the individual interleavers, here from the left to the right. The vacuum means in one row are, for example, placed in a tube 23 which is at both outer ends connected to transportation means, here a chain member, which is part of a chain 24 in order to transport each row of interleavers from the left to the right. The transportation means comprises a drive shaft 25, which drives the chain. The chain 24 is guided in rails 21. The interleaver and the discharged food product 8 are each carried by an interleaver support strips 20. Depending on the size of the interleaver and/or the size of the formed edible material, it may be necessary to use an extra conveyer 26 to assure the handover of the product from the support strips to a subsequent transportation means 27, which remove the product from the inventive apparatus. In a preferred embodiment, the speed of the vacuum means 22 is the same as the speed of the drum. This means that the pitch of the vacuum means is the same as the angular pitch of the cavities in the circumference of the drums. The tube 23 can have both a vacuum and a pressure connection. Both can be swivel connections. It is also possible that the tube 23 is connected via a three-way-valve to a vacuum or a pressure source. This valve can be controlled for example by a PLC. Vacuum means which are in contact with interleaver material will be connected to a vacuum source. The other vacuum means 22 can be provided with pressure in order to clean the inside of tube 23 and/or to clean the vacuum means 22 to prevent blockage for example with meat particles and/or to avoid hygiene problems. The width of the transportation means 9 is equal or exceeds the axial length of the drum 3. As shown in FIG. 2a, after ejection, the products can be stacked such that one interleaver is between two edible materials.

FIGS. 3a-3c show yet another embodiment of the inventive apparatus. In the present case, the transportation means 39 comprises a multitude of small belts. The number of small belts is at least equivalent to the numbers of cavities in one row of the drum, here five belts. The belts 33 are part of a carrier 32 which carries the interleaver 5, row by row, from a storage 4 to the position in which the product is discharged from the drum 3 to the interleaver 5. As can be seen, the storage comprises one compartment of stacked interleaver per belt and/or per cavity in one row, i.e. in the present case five compartments. In the present case, the belts are all driven by one drive shaft. However, it's also feasible that each belt comprises its own drive. The speed of each belt 33 is preferably the same as the speed of the drum 3. This means that the pitch of the carriers 32 on the belts 33 is the same as the angular pitch of the cavities on the circumference of the drum. Besides the carriages 32, the apparatus comprises in the present case also guide-means 30, here two guide-strips per belt 33 in order to assure that the interleaver is in a correct position, when the product is placed on the interleaver. In the present case, the apparatus also comprises an interleaver separation means, which separates the individual interleaver from storage 4 and hands them over to the belt 33. This separation means reciprocates, here rotates, from a position where it takes over the interleaver from a storage 4 to a position where it hands over the individual interleaver to the individual belt 33. The separation means comprises attachment means 34, in the present case vacuum cups 34, in order to attach the interleaver to the separation means during its hand-over to the transportation means, i.e. its clockwise rotation. The position of the separation means during take-over the interleaver from the storage 4 is depicted in FIG. 3b, while its discharge position to the transportation means is depicted in FIG. 3c (reference sign 38). Just before a carriage (32) arrives, vacuum will be disconnected and the carriage moves the paper in the direction of the drum. The separation means comprises motor means 35 for its back and forth rotation. After the products have been placed on the interleavers, the interleavers plus the products are handed over to a discharge belt 37. As shown in FIG. 3a, after ejection, the products can be stacked such that one interleaver is between two edible materials.

Figure 4A:
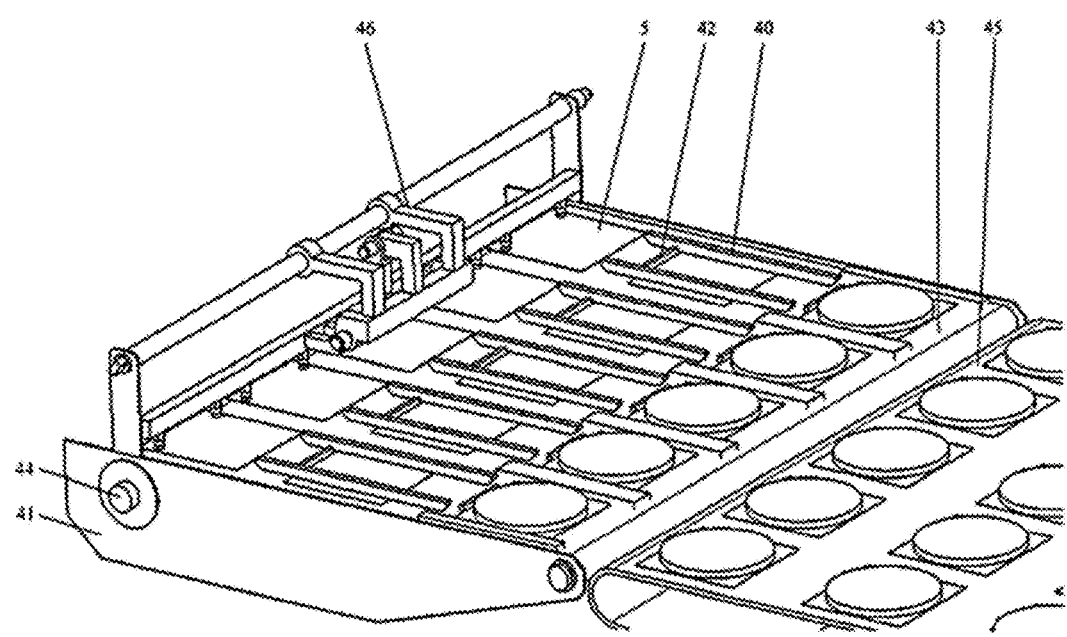
Figures 4B, 4C:
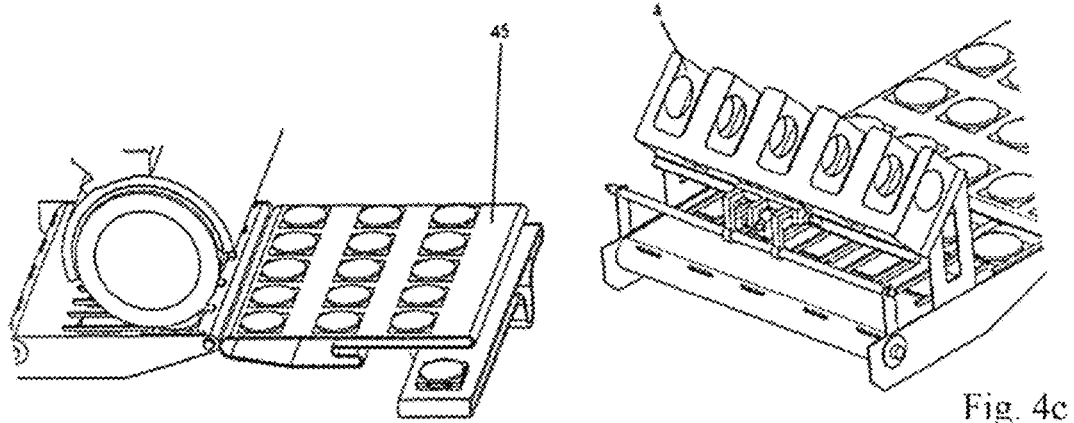
Figure 5A:
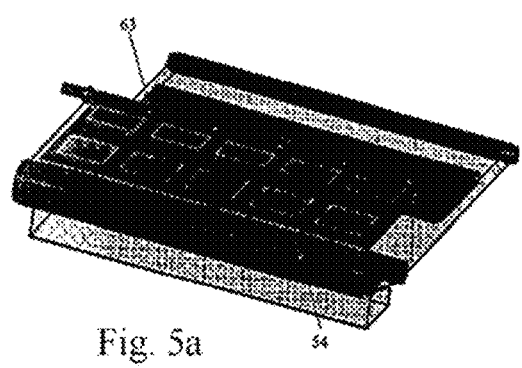
FIGS. 5a-5h show the inventive apparatus with a vacuum belt.
Figure 5B:
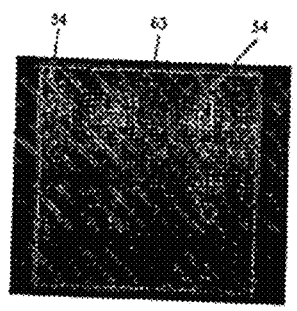
Figure 5C:
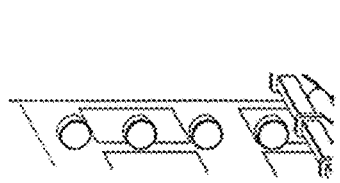
Figure 5D:
Figure 5E:
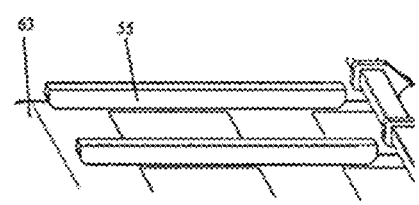
Figures 5F, 5G, 5H:
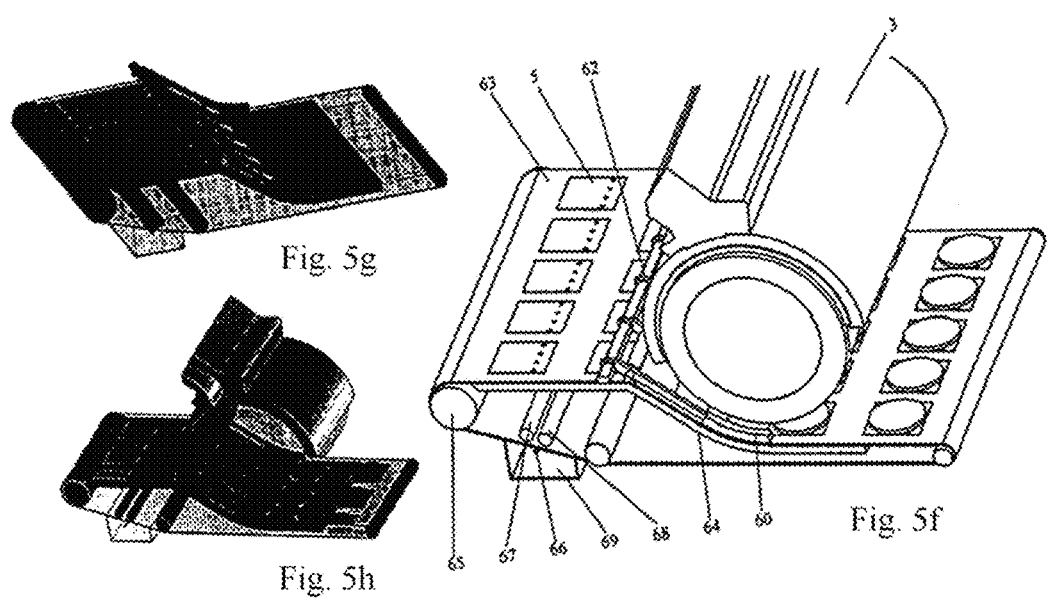

FIGS. 4a-4e show yet another embodiment of the present invention, which is similar to the embodiment according to FIGS. 3a-3c. However, in the present case, there is not a multitude of belts but only one belt 43. Other than that reference can be made to the embodiment according to FIG. 3. The interleaver separation mechanism 46 comprises, in the present case, an internal channel to which vacuum means 47, here vacuum cups, are connected. This mechanism rotates counter-clockwise by goo in the direction of the paper storage 4, then a cylinder 50 is activated which generated another 45° counter-clockwise rotation of the tube with the vacuum cups. Now, the vacuum means 47 have contact with the interleaver in the storage 4. Subsequently, a goo clockwise rotation removes the interleaver from the storage and moves it above the belt 43, which is depicted in FIG. 4d (reference sign 51). Just before a carriage 42, provided on belt 43, approaches the separation means to which an interleaver is connected, the interleaver 5 is disconnected from the vacuum means 47 of the separation means and the carrier 42 moves the interleaver towards the drum. The separation means can be connected to a vacuum or pressure source in order to attach an interleaver to the separation means or to clean the separation means. In the present case, it is also preferable to use guide-means 40 to assure the correct position of the interleaver before the placement of the edible material. The guide-means 40 can be connected to the frame of the apparatus 41. The cleaning of the separation means, especially the vacuum means 47 can take place during the counter clockwise rotation of the separation means. To assure that the paper is deposit on the belt (43) at the right time, timing of the movement of driving means 44 is critical. Cam driven rotating means 48 and 4g are more fail-safe in timing, and will result in a higher production capacity. As shown in FIG. 4b, after ejection, the products can be stacked such that one interleaver is between two edible materials.

In the embodiment according to FIGS. 5a-5h, the transportation means is designed as a vacuum belt 63. This can be achieved by using an gas-tight belt which is provided with holes, slots or other indentations or which is slightly porous. A person skilled in the art understands however that every other transportation means through which a vacuum can be applied, that temporarily fixes the interleaver to the belt, is feasible. The belt 63 is driven by motor means, here a shaft 65. In the present case, the belt moves above the vacuum box 64 which is provided with openings. The vacuum box 64 is gas-tight and connected to a vacuum source. Via the opening in the vacuum box 64, the vacuum is transferred to the vacuum belt 63 and the interleaver is sucked to the vacuum belt. The moving interleaver 5 should be exposed to the vacuum until the product is deposited on the interleaver. In the present case, the apparatus also comprises hold-down-means 60, here strips, to push the belt 63 against the vacuum box 64 to avoid or reduce gas leakage. The means 60 are connected to a support 62, which is connected to a frame 61. Preferably, the support is provided with a spring mechanism to assure enough contact pressure. Vacuumizing of meat particles, dirt and water can result in malfunction of the apparatus, so it is important to keep the vacuum system clean. This can be achieved with a scraper 66 and/or blow pipes 67, 68 and a collection device 69 provided in the return part of the endless vacuum belt. The use of a vacuum allows the belt to make a curve around the circumference of the drum. Advantage is that when a formed food product is discharged somewhat earlier out of the drum as planned, it will still drops correctly above a paper.

Figure 6:
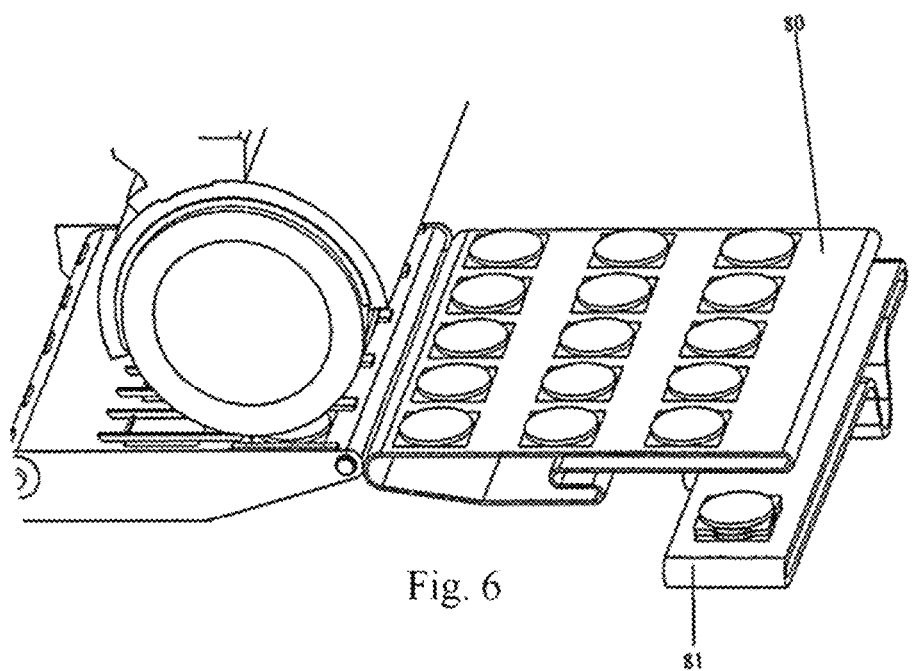
FIG. 6 shows a shuttle belt.

FIG. 6 shows the transportation means 80 downstream of the drum 3, particularly downstream of the transportation means that transport the interleaver to the drum and the product away from the drum. This belt 80 is provided as a shuttle belt. The belt 80 discharges the products to an accumulation belt 81 on which the product can be for example stacked as depicted by the shuttle mechanism. As shown in FIG. 6, after ejection, the products can be stacked such that one interleaver is between two edible materials.

Figures 7A, 7B, 7C:
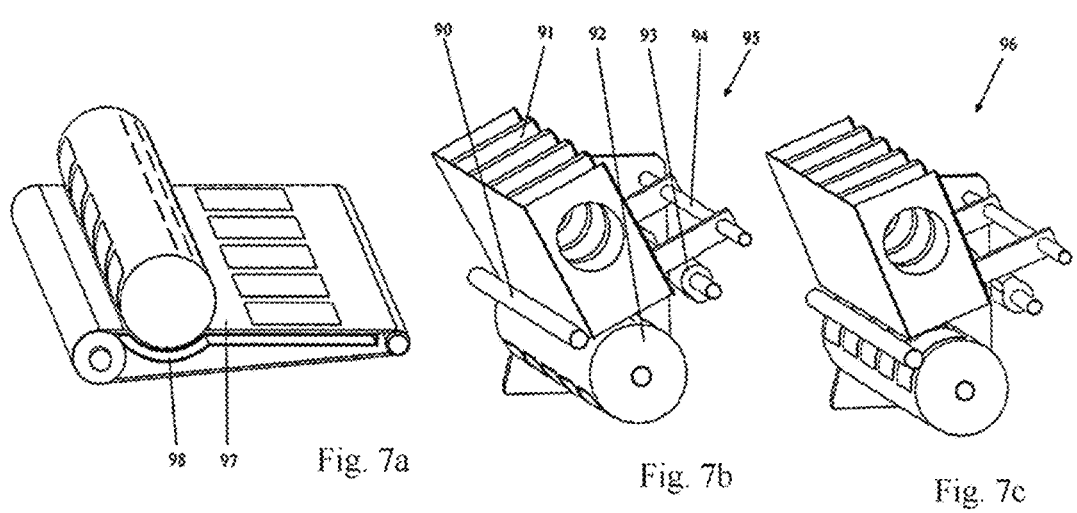
FIG. 7a-FIG. 7c show an embodiment of the present invention with a vacuum drum.

FIGS. 7a-7c show yet another embodiment of the present invention. In this case, the apparatus comprises a vacuum roll 92 as part of the separation means. Due to the vacuum the interleavers are attached to the roll 92 and can be thus discharged from a storage 91 and transported to the drum 3 or an intermediate belt. In the present case, the vacuum roll 92 rotates counter clockwise to, in the present case, a curved vacuum box 98. The vacuum roll is preferably internally divided in 2 separate zones; one zone with vacuum and the other zone with excess pressure. Excess pressure is used during transition of the paper to the vacuum belt and/or for cleaning purposes after depositing the paper. The roll is either made from a porous material or may comprise indentations such as holes or slots. FIG. 7b shows the storage 91 in its discharge position. In this position, the lower side of the storage is in close proximity to the circumference of the vacuum drum 98 and thus interleavers can be removed from the storage 91 and attached to the circumference of the drum. The storage 91 is rotatable around an axis 97 and is driven by a rotating cam 93, which reciprocates the storage 91 from a discharge position 95 to a home position 96 (please compare FIG. 7c) and vice versa. An extra (driven) contact pressure roll 90 can be provided to assure that the interleavers are fixed to roll 92. The vacuum box 98 can be curved around roll 92 to assure that the vacuum belt 97 is pulled around roll 92 and assures no slip in the transport of the interleavers.

Figure 8A:
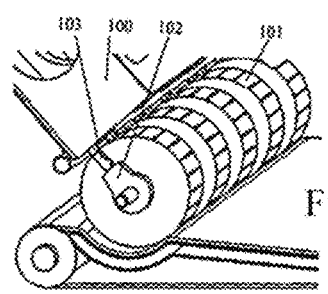
FIG. 8a and FIG. 8b show an embodiment of the present invention with a multitude of rolls.
Figure 8B:
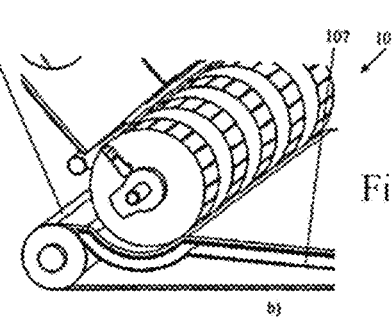

FIG. 8a and FIG. 8b show yet another embodiment of the inventive apparatus. In this case, the paper storage 110 is fixed and each compartment has its own vacuum roll 101 as described according to FIGS. 7a-7c. These rolls can be driven simultaneously or individually. Further, each compartment has two vacuum means 103, here vacuum cups, which separate, here draw the interleaver out of the interleaver storage 100. The vacuum means 103 are driven by a cam 102, which can move the vacuum means radially inwardly and outwardly. As shown by reference sign 104 each vacuum cup is moved outwardly towards the interleaver storage 100 to pull the interleaver out off the interleaver storage. After removal of the interleaver from the storage, the vacuum means 103 are moved inwardly again, see reference sign 105.

Figure 9A:
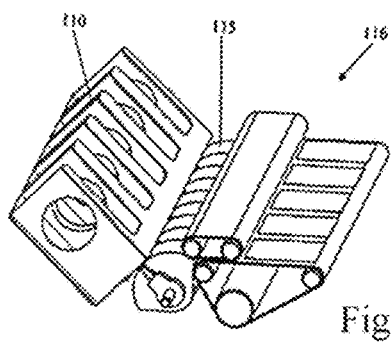
FIG. 9a and FIG. 9b show shows yet another embodiment of the present invention.
Figure 9B:
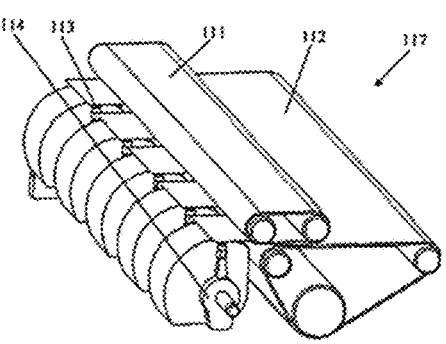

FIG. 9a and FIG. 9b show yet another embodiment of the present invention which is essentially the same as FIG. 8a and FIG. 8b. However, in the present case, not a entire roll but only a quarter segment 115 of the roll is provided which reciprocates between a pick-up from the and a discharge position. This segment of the roll supports the interleaver during the hand over from pick up position to the hand-over position. Each roll has vacuum means 113, which can moved inwardly and outwardly by a cam shaft 114. FIG. 9a shows the pick-up position, in which the interleaver is removed from the storage and FIG. 9b shows the discharge position, in which the interleaver is handed over to transportation means 112. During hand over, the vacuum must be turned off. In the present case, the subsequent transportation means comprises a lower belt 112 and an upper belt 111 in order to prevent slipping of the paper during its transportation.

FIG. 10a and FIG. 10b show yet another embodiment of the inventive apparatus. In the present case, the separation means 128 reciprocates between a pick-up position (FIG. 10a) and a discharge position (FIG. 10b). The separation means 128 has vacuum means 125 in order to fix the interleaver to the means 128 during its motion. A contract pressure roll 121 can added to prevent that the interleaver slips during transition from the vacuum means 125 to belt 122. Reference is made to the disclosure according to the other figures, particularly FIGS. 4a-4e.

FIG. 11 shows yet another embodiment of the present invention. In the present case, the interleaver storage is provided as a roll and is subsequently cut by cutting means 141 into the desired length. These interleavers 142 are transported away by transport mechanisms for example vacuum belts or the drum itself as depicted by arrows 143. The person skilled in the art understands that it is not only possible to cut square or rectangular interleavers with the embodiment according to FIG. 11 but that it is also possible to provide round or oval or any other shape of interleavers with the embodiment according to FIG. 11. In this case, the means 141.

Preferably one roll 140 per cavity per row of cavities in the drum is provided, e.g five cavities in one row results preferably in five rolls. However, it is also preferred to provide only one roll. This roll is then cut, if needed, into individual strips, equivalent to the number of cavities per row of cavities in the drum, preferably, while the interleaver material is rolled off from the roll. Each strip is then cut into the individual interleavers 142. In this case the apparatus comprises cutting means for a longitudinal- and a cross-cut.

Figure 12A:
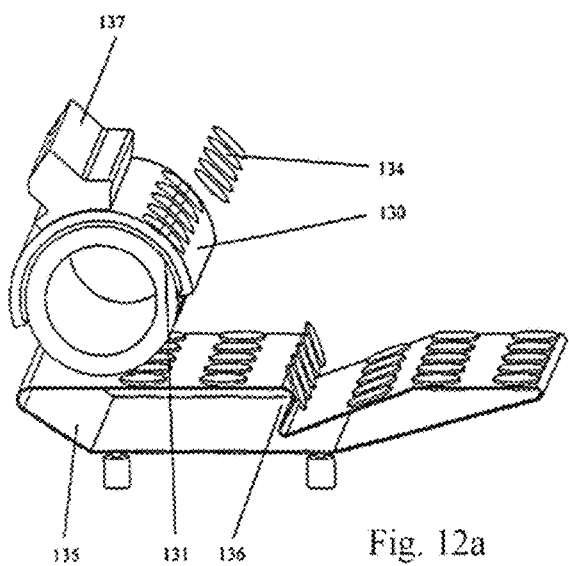
FIG. 12a and FIG. 12b show another embodiment of the present invention.
Figure 12B:
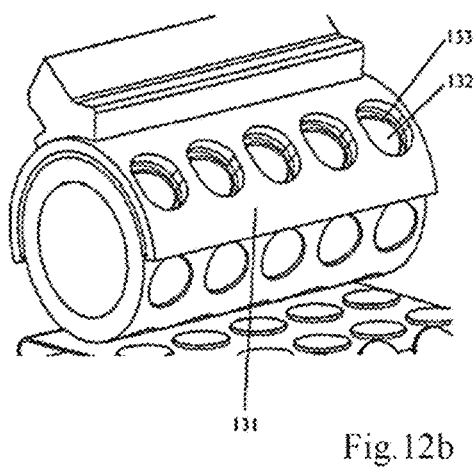

FIG. 12a and FIG. 12b show yet another embodiment of the present invention. In this case, the drum comprises a multitude of cavities into which the edible material is pressed to form the patty. The cavity especially its bottom wall 132 and/or its side wall 133 are made from a permeable material through which a vacuum and/or pressure can be applied to the edible material and/or the interleaver. In the present case, the interleavers 134 are directly placed into the cavities before the edible material is pressed into the cavities. Before, during and after the insertion of the interleavers 134 into the cavities, vacuum can be applied especially to the bottom wall in order to fix the interleavers 134 in the cavities, particularly during their motion. During the filling of the cavities entrapped air can be vented through the sidewall 133. However, it is also possible to provide permeable interleavers 134, through which the entrapped air can escape through the bottom 132 of the cavity. After the interleavers have been inserted into the cavities, the drum rotates counter clockwise and the edible material is fed through port 137 into the cavities. The drum keeps rotating and the formed products plus the interleavers are subsequently discharged on, for example, transportation means 135, here a belt. The discharge can be supported by applying pressurized air to the sidewall and/or the bottom of the cavities to eject the products plus the interleaver from the cavity. If needed, the products plus the interleaver can subsequently turned around by 180° by a flip mechanism as depicted in FIG. 12a. From FIG. 12b it becomes evident that, in the present case, preferably also the housing of the drum has openings 138 through which the interleavers can be inserted into the cavities. However, it is also feasible that the interleavers are added to the cavities before the cavities are covered by the housing 130.

The present embodiment of the invention is particularly useful in cases in which the interleaver has the same or a smaller size than the formed product. In order to avoid that the connection between the product and the interleaver loosens after the product has been (not depicted).

LIST OF REFERENCE SIGNS 1 food product forming apparatus
2 housing
3 drum
4 interleaver storage
5 interleaver 6 vacuum means
7 guidance for the product 8
8 product
9 transportation means, belt
10 interleaver carriage
11 drive for the interleaver carriage
20 paper support means, paper support strip
21 guiding means
22 vacuum means
23 tube
24 chain
25 drive shaft
26 take over conveyor
27 transportation means, belt
28 accumulation belt
30 guiding means
31 frame
32 interleaver carriage
33 transportation means, belt
34 vacuum means
35 drive for the separation means
36 drive shaft for the transportation means 33
37 transportation means, belt
38 position of the interleaver separation means during depositing of an interleaver on a transportation means
39 transportation means
40 guiding means
41 frame
42 interleaver carrier
43 transportation means, belt
44 driving means for the transportation means 43
45 transportation means, belt
46 drive for the interleaver separation means
47 vacuum means
48 rotating means
49 rotating means
50 drive, cylinder
51 position of the interleaver separation means during depositing of an interleaver on a transportation mean
52 position of the interleaver separation means during individualizing of an interleaver out of a storage
54 perforation, slot
55 guiding means
60 holder for interleaver
62 support
63 vacuum transportation means, vacuum belt
64 vacuum box
65 drive means
66 cleaning means, scraper
67 cleaning means, blow pipe
68 cleaning means, blow pipe
69 collection means, collection tray
80 shuttle belt
81 accumulation belt
90 pressure roll, preferably driven
91 interleaver storage
92 roll, vacuum roll
93 drive for the interleaver storage
94 rotation axis
95 position of the interleaver storage 91 during depositing of an interleaver
96 retreated position of the interleaver storage 91
97 transportation means, vacuum transportation means
98 vacuum box
100 interleaver storage
101 roll, vacuum roll
102 cam shaft
103 vacuum means
104 position of the vacuum means 103 during pulling of an interleaver out of the storage
105 position of the vacuum means 103 during transportation of the interleaver
106 belt, vacuum belt
107 vacuum box
110 interleaver storage
111 upper transportation means
112 lower transportation means
113 vacuum means
114 drive means, cam
115 support
116 position of the vacuum means 113 during pulling of an interleaver out of the storage
117 position of the vacuum means 113 during transportation of the interleaver
120 interleaver storage
121 pressure roll, preferably driven
122 transportation means, belt
123 rotation axis
124 rotation axis
125 vacuum means
126 position during pulling of an interleaver out of the storage
127 position during depositing of an interleaver on the transportation means
128 separation means
130 housing
131 shoe
132 permeable bottom wall in the cavity of the drum
133 permeable side wall in the cavity of the drum
134 interleaver
135 transportation means, belt
136 flip mechanism
140 interleaver storage, roll
141 cutting means
142 interleaver
143 transportation means

The invention claimed is:

1. An apparatus for formation of products comprising an edible material and an interleaver, the apparatus comprises:
  i) a drum with mould cavities in which the edible material is formed, each of the mould cavities having a bottom and a sidewall;
  ii) an interleaver storage having one or more interleavers; and
  iii) a transportation means configured to transport the one or more interleavers from the interleaver storage to a discharge location that is located underneath of the drum where the edible material is discharged from the mould cavities and then placed onto a respective one of the interleavers located at the discharge location;
  wherein the bottom and/or the sidewall is made from a porous material, and pressurized gas is forced through the porous material to eject the edible material from the mould cavities;
  wherein the apparatus comprises a programmable logic controller that is configured to control a position of the transportation means so that the one or more interleavers are placed in the discharge location where the edible material is ejected from the mould cavities and onto the respective one of the interleavers; and
  wherein the transportation means comprises an attachment means including a vacuum means that is configured to attach the one or more interleavers to the transportation means.

2. The apparatus according to claim 1, wherein after ejection, the products are stacked such that one of the one or more interleavers is located between two edible materials.

3. The apparatus according to claim 1, wherein the apparatus comprises a separation means to separate the one or more interleavers from the interleaver storage, and
wherein the separation means comprises a vacuum roll.

4. The apparatus according to claim 1, wherein the interleaver storage is shiftable between two positions,
wherein in a home position no interleavers are removed from the interleaver storage, and in a separation position the one or more interleavers are handed over to the transportation means.

5. The apparatus according to claim 3, wherein the separation means is shiftable between two positions,
wherein in a first position the separation means removes the one or more interleavers from the interleaver storage and in a second position the one or more interleavers are handed over to the transportation means.

6. The apparatus according to claim 5, wherein the separation means are gear-driven by a cam.

7. The apparatus according to claim 1, wherein the apparatus comprises a sensor to detect presence of the one or more interleavers in a location upstream of the drum.

8. The apparatus according to claim 1, wherein a rotational speed of the drum is adjustable, and
wherein a speed of the transportation means is adjustable.

9. The apparatus according to claim 1, wherein a speed of the vacuum means is configured to match a rotational speed of the drum.

10. The apparatus according to claim 1, wherein the apparatus comprises a second transportation means downstream of the drum to transport the one or more interleavers and the edible material away from the drum.

11. The apparatus according to claim 10, wherein the transportation means and/or the second transportation means is provided as shuttle-belt and/or are height adjustable.

12. The apparatus according to claim 1, wherein the drum includes a plurality of rows of the mould cavities, and the transportation means comprises one belt corresponding to each of the rows, and the interleaver storage comprises one interleaver sub-storage for each corresponding belt,
wherein the apparatus comprises a separation means to separate the one or more interleavers from the interleaver storage, and
wherein the separation means rotates back and forth from a position where the separation means removes the one or more interleavers from the interleaver storage to a position where the separation means places the one or more interleavers on the corresponding belt.

13. The apparatus according to claim 5, wherein the separation means comprises a vacuum roll,
wherein the one or more interleavers are separated from the interleaver storage and attached to the vacuum roll via a vacuum and transported via the vacuum roll to the drum or to an intermediate belt.

14. The apparatus according to claim 7, wherein the sensor is located upstream of the drum, and
wherein after the ejection, the products are stacked on a shuttle belt.

15. The apparatus according to claim 5, wherein the separation means comprises an attachment means to attach the one or more interleavers to the separation means when the one or more interleavers are handed over to the transportation means, and
wherein the separation means comprises vacuum cups.

16. The apparatus according to claim 4, wherein the interleaver storage is gear driven by a cam.

17. The apparatus according to claim 12, wherein the apparatus comprises a sensor to detect the presence of the one or more interleavers,
wherein a rotational speed of the drum and the transportation means are adjustable,
wherein the apparatus comprises a second transportation means downstream of the drum to transport the one or more interleavers and the edible material away from the drum, and
wherein the transportation means and/or the second transportation means is provided as a shuttle-belt and/or are height adjustable.

* * * * *